United States Patent [19]
Marsh et al.

[11] Patent Number: 5,726,630
[45] Date of Patent: Mar. 10, 1998

[54] DETECTION OF MULTIPLE ARTICLES

[75] Inventors: Michael John Camille Marsh; Andrzej Lenarcik, both of Johannesburg; Clinton Aiden Van Zyl, Pretoria; Andries Christoffel Van Schalkwyk, Pretoria; Marthinus Jacobus Rudolph Oosthuizen, Pretoria, all of South Africa

[73] Assignee: British Technology Group Limited, London, England

[21] Appl. No.: 580,913

[22] Filed: Dec. 29, 1995

Related U.S. Application Data

[63] Continuation of Ser. No. 154,329, Nov. 18, 1993, Pat. No. 5,519,381.

[30] Foreign Application Priority Data

Nov. 18, 1992 [ZA] South Africa ................. 92/8905

[51] Int. Cl.⁶ ................................. G08B 13/14
[52] U.S. Cl. ............. 340/572; 340/825.54; 235/435; 235/385
[58] Field of Search ................. 340/572, 825.54, 340/508, 568; 235/435, 436, 383, 375, 325

[56] References Cited

U.S. PATENT DOCUMENTS

| | | | |
|---|---|---|---|
| 3,981,011 | 9/1976 | Bell, III | 342/44 |
| 4,075,632 | 2/1978 | Baldwin | 340/870.01 |
| 4,144,534 | 3/1979 | Prickett et al. | 342/43 |
| 4,308,530 | 12/1981 | Kip et al. | 340/572 |
| 4,495,496 | 1/1985 | Miller, III | 340/825.54 |
| 4,614,945 | 9/1986 | Brunius et al. | 340/870.03 |

(List continued on next page.)

FOREIGN PATENT DOCUMENTS

| | | |
|---|---|---|
| 0161779 | 11/1985 | European Pat. Off. . |
| 0285419 | 10/1988 | European Pat. Off. . |
| 323 011 A2 | 11/1988 | European Pat. Off. . |
| 0301127 | 2/1989 | European Pat. Off. . |
| 0405695 | 1/1991 | European Pat. Off. . |
| 441 712 A1 | 8/1991 | European Pat. Off. . |
| 467036 | 1/1992 | European Pat. Off. . |
| 494114 | 7/1992 | European Pat. Off. . |
| 2 658 059 | 8/1991 | France . |
| 2 101 879 | 7/1972 | Germany . |
| 2354067 | 5/1975 | Germany . |
| 40 42 260 A1 | 7/1992 | Germany . |
| 85/6178 | 8/1985 | South Africa . |
| 92/0039 | 1/1992 | South Africa . |
| 93/6267 | 8/1993 | South Africa . |
| 2116808 | 9/1983 | United Kingdom . |
| 2 152 335 A | 7/1985 | United Kingdom . |
| 2 191 368 A | 12/1987 | United Kingdom . |
| WO 82/00910 | 3/1982 | WIPO . |
| 90/00785 | 1/1990 | WIPO . |
| 90/15343 | 12/1990 | WIPO . |
| WO 90/16051 | 12/1990 | WIPO . |
| WO 91/13415 | 9/1991 | WIPO . |

*Primary Examiner*—Jeffery Hofsass
*Assistant Examiner*—Benjamin C. Lee
*Attorney, Agent, or Firm*—Cushman, Darby & Cushman IP Group of Pillsbury, Madison & Sutro LLP

[57] ABSTRACT

An identification system comprises an interrogator and a plurality of transponders. The interrogator includes a transmitter which transmits at least two independent interrogation signals to the transponders, and a receiver for receiving response signals from the transponders. The interrogator also includes processor means for identifying the transponders from data in the received response signals. Each transponder comprises receiving means, a code generator, and transmitter means connected to the code generator. On receipt of at least one of the transmitted interrogation signals the transponder transmits a response signal containing data which identifies it. The interrogation signals may be transmitted continuously or intermittently. In a preferred embodiment, the interrogation signals are relatively narrow bandwidth signals at different frequencies. The receiving means of each transponder has a relatively broad reception bandwidth so that the transponder is responsive to one or more of the interrogation signals.

140 Claims, 8 Drawing Sheets

U.S. PATENT DOCUMENTS

| | | | |
|---|---|---|---|
| 4,631,708 | 12/1986 | Wood et al. | 367/2 |
| 4,673,932 | 6/1987 | Ekchian et al. | 340/825.54 |
| 4,691,202 | 9/1987 | Denne et al. | 340/825.54 |
| 4,710,752 | 12/1987 | Cordery | 340/572 |
| 4,862,160 | 8/1989 | Ekchian et al. | 340/568 |
| 4,862,176 | 8/1989 | Voles | 342/45 |
| 4,870,391 | 9/1989 | Cooper | 340/572 |
| 5,036,308 | 7/1991 | Fockens | 340/572 |
| 5,081,458 | 1/1992 | Meunier | 340/572 |
| 5,103,222 | 4/1992 | Hogen Esch et al. | 340/572 |
| 5,105,190 | 4/1992 | Kip et al. | 340/572 |
| 5,124,699 | 6/1992 | Tervoert et al. | 340/572 |
| 5,150,114 | 9/1992 | Johansson | 340/825.54 |
| 5,151,684 | 9/1992 | Johnsen | 340/572 |
| 5,218,343 | 6/1993 | Stobbe et al. | 340/572 |
| 5,221,831 | 6/1993 | Geiszler | 340/572 |
| 5,239,167 | 8/1993 | Kipp | 235/383 |
| 5,260,690 | 11/1993 | Mann et al. | 340/572 |
| 5,381,137 | 1/1995 | Ghaem et al. | 340/572 |
| 5,387,900 | 2/1995 | Plonsky et al. | 340/572 |

Figure 7
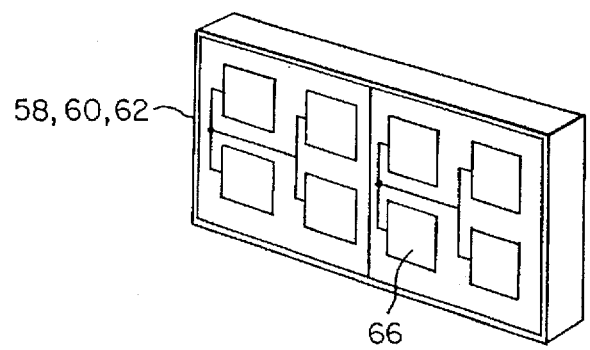
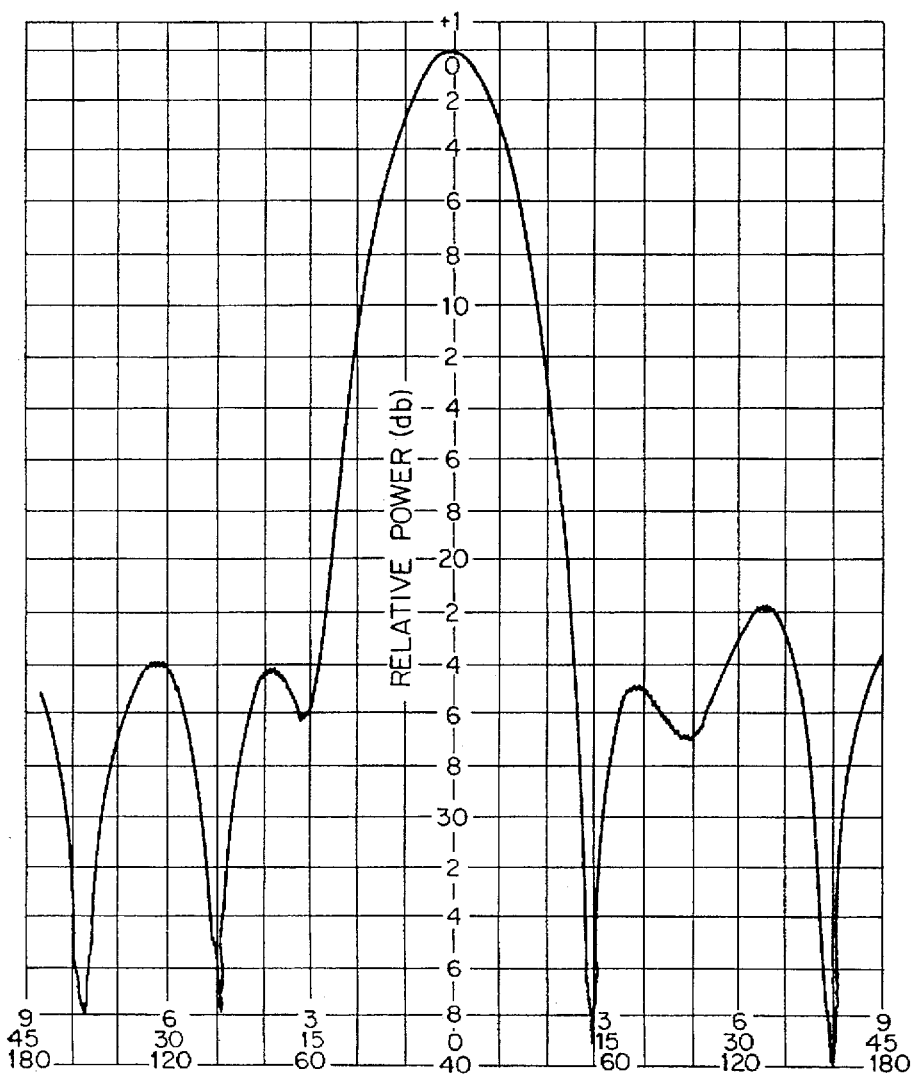
Figure 8

Figure 10
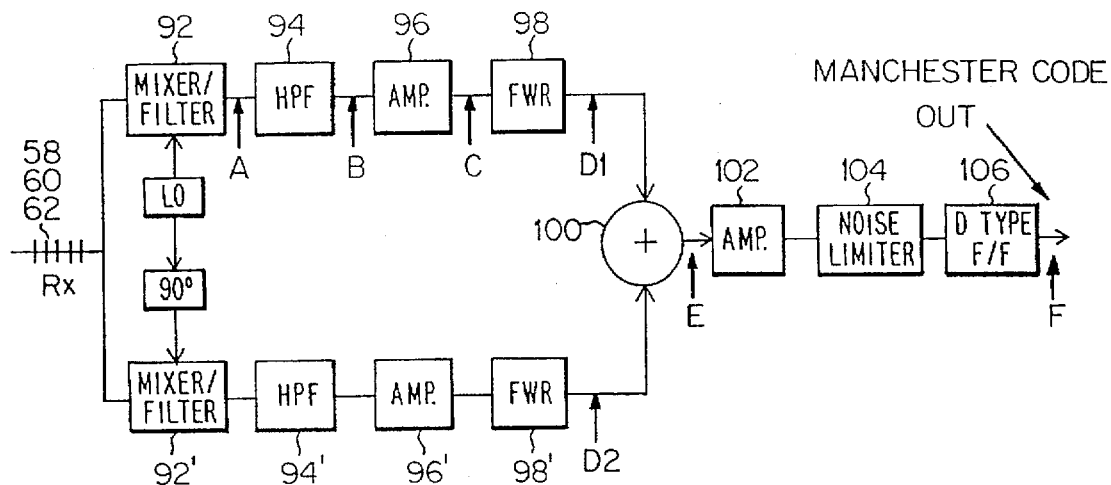
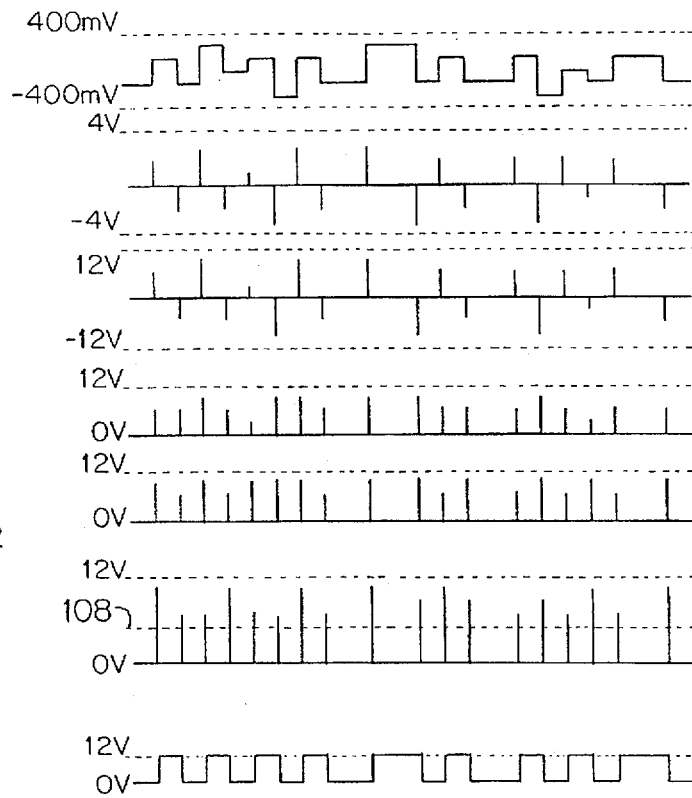
Figure 11A
Figure 11B
Figure 11C
Figure 11D₁
Figure 11D₂
Figure 11E
Figure 11F Figure 12
```
              ABC SUPERMARKET
                CUSTOMER RECEIPT
               Tue Oct 12 1993  14:15
Romany Creams (200g)        @ R 2.99  x 4      R 11.96
Outspan Rusks (500g)        @ R 4.76  x 2      R  9.52
Kelloggs Cornflakes (300g)  @ R 4.34  x 3      R 13.98
Weetbix (900g)              @ R 6.99  x 3      R 20.97
Coffee Creamer (500g)       @ R 6.99  x 2      R 13.98
Kelloggs Variety Pack       @ R10.59  x 2      R 21.18
Lunch Wrap (10m x 300mm)    @ R 1.71  x 4      R  6.84
Carlton Towels (120 x 2ply sheets) @ R 2.99 x 4  R 11.96
Mentadent-P (100ml)         @ R 3.59  x 1      R  3.59
                                               ------
                         Total Items: 25   Total: R 113.02
           HAVE A GOOD DAY - CALL AGAIN!
```
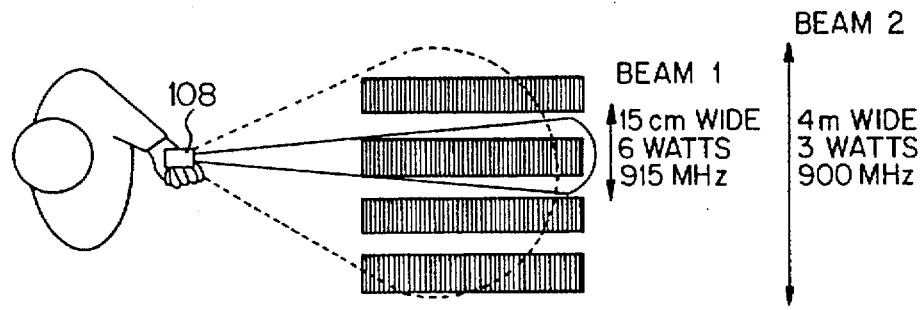
Figure 13
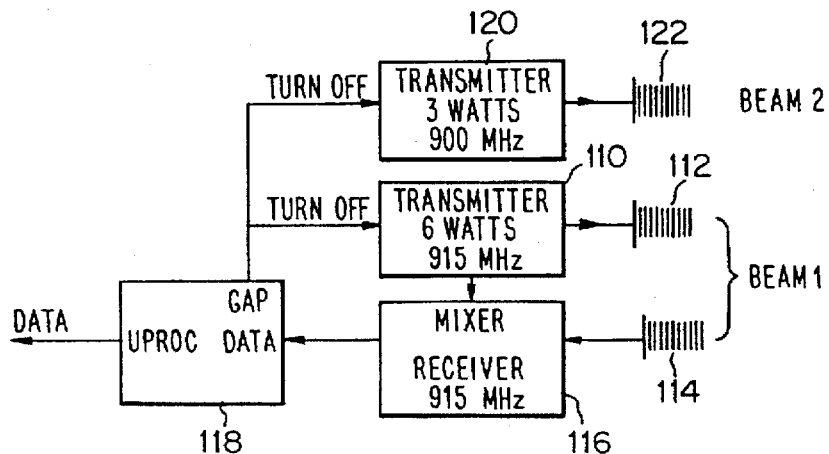
Figure 14

5,726,630

1

DETECTION OF MULTIPLE ARTICLES

This application is a continuation of application Ser. No. 08/154,329 filed Nov. 18, 1993, now U.S. Pat. No. 5,519,381.

BACKGROUND OF THE INVENTION

This invention relates to an identification system comprising an interrogator and a plurality of transponders.

U.S. patent application Ser. No. 07/816,893 describes an identification system comprising an interrogator and a number of individual transponders which may be attached to or associated with articles to be identified. The articles to be identified may be, for example, items of stock in a supermarket or warehouse.

It is an object of the invention to increase the probability of transponder identification in a system of the kind referred to above.

SUMMARY OF THE INVENTION

According to the invention an identification system comprises an interrogator and a plurality of transponders, the interrogator including transmitter means for transmitting at least two independent interrogation signals to the transponders, receiver means for receiving response signals from the transponders, and processor means for identifying the transponders from data in the response signals; each transponder comprising receiving means, a code generator, and transmitting means connected to the code generator, so that on receipt of at least one of the transmitted interrogation signals the transponder transmits a response signal containing data which identifies the transponder.

The transmitter means of the interrogator may be adapted to transmit the at least two interrogation signals continuously.

Alternatively, the transmitter means of the interrogator may be adapted to transmit the at least two interrogation signals intermittently, with an interval between successive interrogation signals which is less than a minimum period within which transponders which have been disabled by a disable instruction in an interrogation signal reset themselves automatically.

The at least two interrogation signals may have respective different frequencies which are selected to fall within the reception bandwidth of the receiving means of the transponders.

Preferably, the at least two interrogation signals are relatively narrow bandwidth signals, the receiving means of each transponder having a relatively broad reception bandwidth within which the respective different frequencies of the at least two interrogation signals fall, so that the transponder is responsive to one or more of the interrogation signals.

Preferably, each interrogation signal is modulated with data, the data modulation bandwidth of each interrogation signal being less than the spacing between the respective different frequencies of the interrogation signals.

The transmitting means of the transponder may comprise an antenna and means for modulating the reflectivity of the antenna, so that the response signal of the transponder comprises one or more interrogation signal carriers modulated with the data which identifies the transponder.

Preferably, the transmitter means of the interrogator comprises at least two spaced apart transmitting antennas and the receiver means comprises at least two spaced apart receiving antennas.

2

The transmitter means and the receiver means may comprises at least two spaced apart antenna units, each antenna unit comprising a transmitting antenna and an adjacent receiving antenna.

Each antenna may comprise a patch array designed to operate at a frequency between 800 MHz and 1 GHz.

Preferably, at least two of the respective transmitting and receiving antennas are polarized differently from one another.

In an alternative embodiment of the invention, the transmitting means of the interrogator comprises a transmitting antenna, at least first and second transmitters for generating interrogation signals at respective different frequencies, and switch means for switching the outputs of the transmitters alternately to the transmitting antenna.

In this embodiment, the receiver means and the processor means of the interrogator are preferably adapted to distinguish response signals from transponders in response to interrogation signals transmitted at the respective different frequencies of the at least first and second transmitters.

Preferably, the processor means is adaped to detect duplicate transponder response signals transmitted on two or more of the respective different frequencies and to disregard them.

The transmitter means and the receiver means of the interrogator may be mounted on or adjacent to a structure which defines an interrogation zone through which the transponders to be identified may be passed.

In a preferred embodiment, the transmitter means and the receiver means of the interrogation are supported by a frame defining a passage through which a conveyance containing articles to which respective transponders are attached can pass.

The respective different frequencies of the at least two interrogation signals are preferably selected so that there are no overlapping nulls in the electric fields of the interrogation signals within a predetermined distance of the transmitter means of the interrogator.

The system may include processor means for recording data received from each identified transponder and for relating the received data to stored data corresponding to the received data.

The processor means may be adapted to store price or identification data of articles to which different transponders are attached, and to relate the identification codes of identified transponders thereto.

The system may include display means for generating a display in which the articles to which respective transponders are attached are associated with price data.

The system may further include printer means for generating a printout of the display.

According to another aspect of the invention an identification system comprises an interrogator and a plurality of transponders, the interrogator including transmitter means for transmitting an interrogation signal and an inhibiting signal having respective different frequencies to the transponders, receiver means for receiving response signals from the transponders, and processor means for identifying the transponders from data in the response signals; each transponder comprising receiving means for receiving the transmitted interrogation signal and the inhibiting signal, a code generator, and transmitting means connected to the code generator, the respective different frequencies of the interrogation signal and the inhibiting signal being selected to fall within the reception bandwidth of the receiving means of the transponder, the transponder being adapted to transmit a response signal containing data which identifies the transponder on receipt of the interrogation signal, to be disabled by a turn-off instruction in the interrogation signal on successful identification of the transponder, and to remain disabled while it continues to receive the inhibiting signal.

Preferably, the interrogation signal is a relatively directional signal, and the inhibiting signal is a relatively widely dispersed signal.

The inhibiting signal has a beam width which is preferably at least 5 times greater than that of the interrogating signal.

Preferably, the interrogation signal is a relatively high power signal and the inhibiting signal is a relatively low power signal.

The turn-off instruction to the transponder may be transmitted in both the interrogation signal and the inhibiting signal.

BRIEF DESCRIPTION OF THE DRAWINGS

FIG. 7 is a plan view of an antenna unit of the antenna assembly of FIG. 6;

FIG. 8 is a graph showing the radiation pattern of an antenna element of the antenna unit FIG. 7;

FIG. 10 is a more detailed block schematic diagram of a quadrature receiver/amplifier of FIG. 9;

FIGS. 11A–11F are waveform diagrams at different points in FIG. 10;

FIG. 12 is a sample customer receipt printed by the system of FIGS. 5 and 6;

FIG. 13 is a schematic illustration of an alternative embodiment of the invention; and FIG. 14 is a block schematic diagram illustrating the operation of the embodiment of FIG. 13.

DESCRIPTION OF EMBODIMENTS

Figure 1:
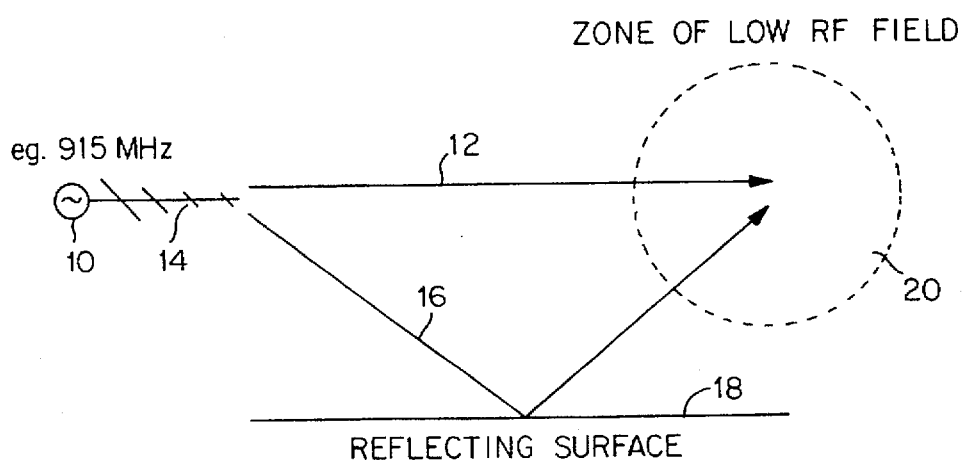
FIG. 1 is a diagram illustrating the creation of a null in an interrogation zone as a result of a reflected signal.

FIG. 1 illustrates a problem which occurs in identification systems of the kind referred to when there is a reflecting surface close to the interrogator 10 and/or the interrogation zone in which it is desired to detect transponders. A primary interrogation signal 12 is transmitted directly from the antenna 14 of the interrogator 10 to the interrogation zone, while a secondary interrogation signal 16 is reflected from the reflecting surface. At certain distances from the interrogator, the direct and reflected signals 12 and 16 will be half a wavelength out of phase, causing nulls in the electric field of the interrogation signal. This results in zones 20 of the interrogation zone having a weak interrogation signal, with insufficient RF energy to power up the transponders. As a result of this, certain transponders may go undetected by the interrogator.

Figure 2:
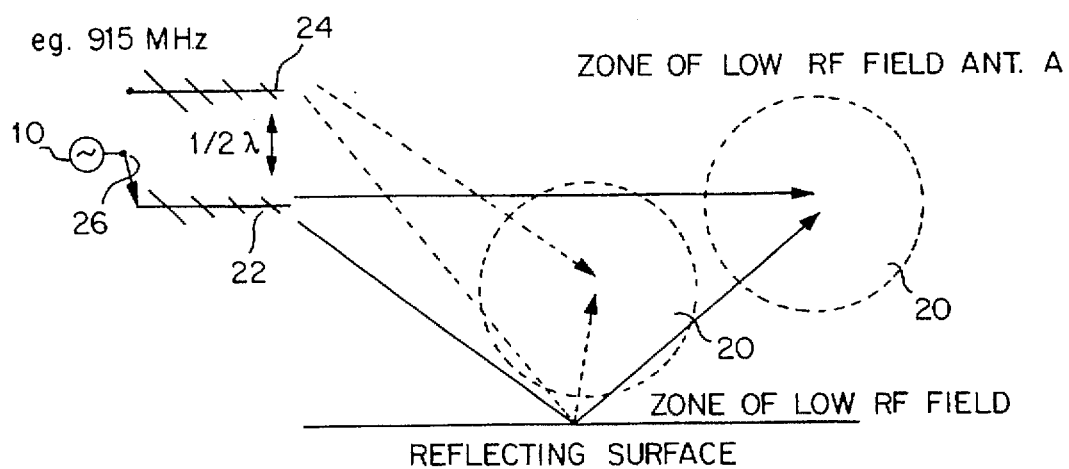
FIG. 2 is a schematic diagram illustrating a first embodiment of the invention.

FIG. 2 illustrates schematically a first solution to the problem. In FIG. 2, the interrogator 10 is provided with first and second antennas 22 and 24, which are spaced one half wavelength apart, and which can be selected by means of switch means 26. Due to the different spacing of the antennas, the nulls or zones 20 of low power occur at different locations. In use, the interrogator 10 is first connected to the antenna 22 and scans articles in the interrogation zone, recording the identity codes received from the various transponders attached to the articles. The switch means 26 then connects the interrogator 10 to the antenna 24, and the process is repeated. The identification codes recorded during both interrogation procedures are compared, and duplicated codes are discarded. In this way, all of the articles in the interrogation zone can be identified, despite some of them lying in portions of the interrogation zone which are in an RF null of one of the antennas 22 or 24.

The above system is adequate for identifying articles which each have a transponder with a unique identification code. However, where a number of articles are provided with transponders all having the same identification code, it is not possible to count the number of articles accurately using the system of FIG. 2, since it is not possible to compare the results of the first and second interrogation procedures in such a way as to discard duplicate readings.

Figure 2A:
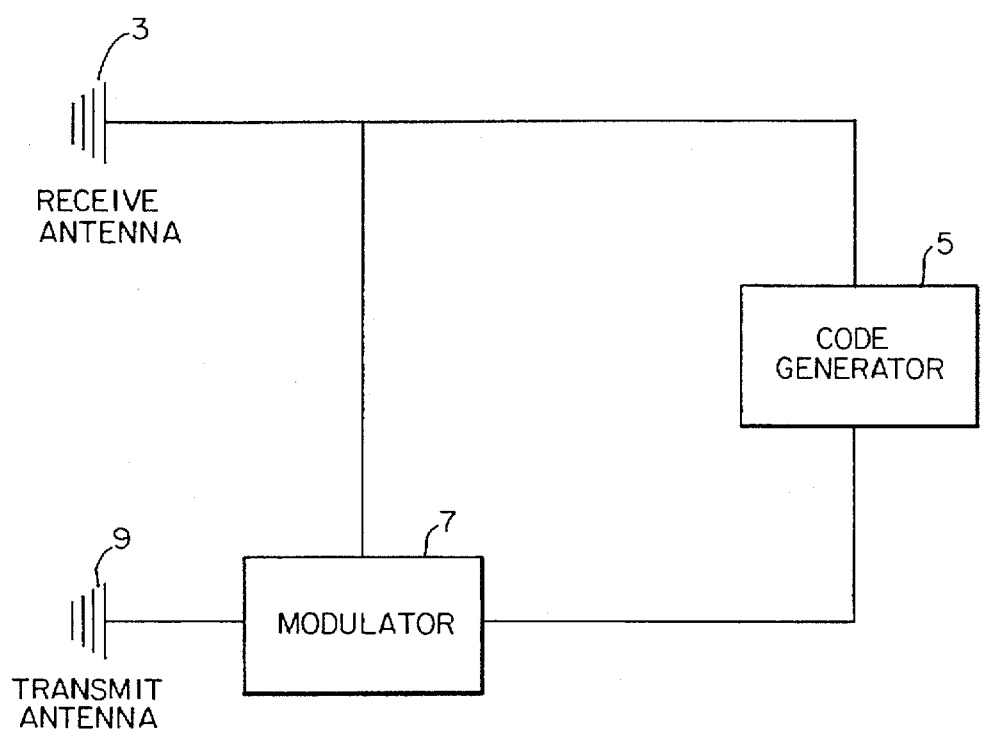
FIG. 2A provides a simplified block diagram illustration of the functional elements of one of the transponders.

FIG. 2A provides a simplified illustration of the structure of one of the transponders 38. As shown, each transponder comprises receiving means, i.e. a receiving antenna 3, a code generator 5, and a transmitting means. The transmitting means comprises a modulator 7 and a transmitting antenna 9. The modulator 7 connects to the code generator, so that on receipt of any one or all of the transmitted interrogation signals the transponder transmits a response signal containing data which identifies the transponder.

The system described in U.S. patent application Ser. No. 07/816,893, the contents of which are incorporated herein by reference, includes a number of identical transponders, which are attached to articles of the same kind, to allow automatic stocktaking. Each transponder is disabled after it has successfully communicated its presence to the interrogator, and remains in a disabled state until the RF field caused by the interrogation signal has been removed completely. Clearly, a system which has deep RF nulls in its interrogation zone would not be suitable for use with this type of tag, as individual tags might interpret the lack of RF power in a null as the turning off of the interrogator. As a result, a transponder which had been disabled after successful identification could be turned on again when the position of the null moves, providing an extra signal and thus causing an incorrect count.

Figure 3:
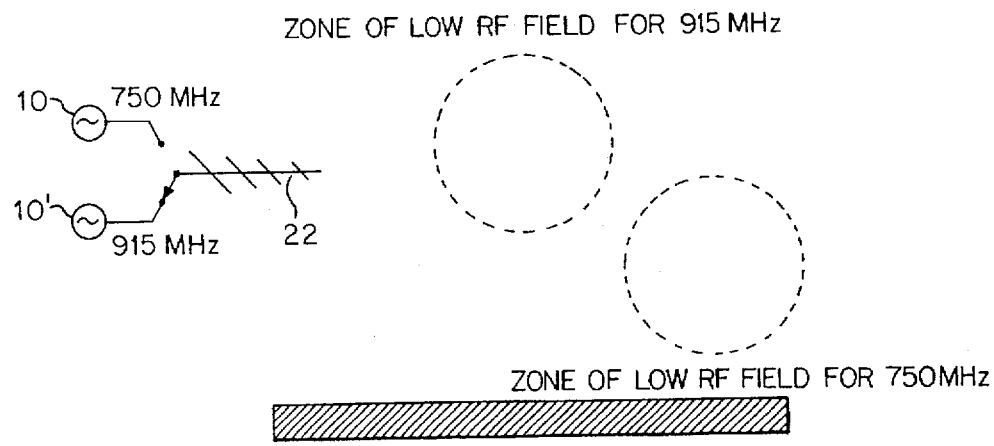
FIG. 3 is a diagram illustrating the effect of using different frequencies for the interrogation signal.

In order to overcome this problem, an interrogator is provided which transmits interrogation signals at at least two different frequencies, either simultaneously or intermittently. For example, frequencies at 750 MHz and 915 MHz can be employed. These frequencies are chosen so that there is no location within the interrogation zone where there is an RF null at both frequencies, as indicated in FIG. 3. Since the transponders are powered by a rectifier (not shown) which rectifies the received RF energy from the interrogation signals, and as RF energy will be present at each location in the interrogation zone from at least one of the interrogation signals, the transponders will remain powered continuously, and will be able to remember a "disable instruction" received from the interrogator after successful identification.

In the case where the different interrogation signals are not all transmitted continuously and simultaneously, the interval between successive transmissions must be less than the minimum period within which disabled transponders reset themselves automatically.

Since the modulators 7 of the transponders modulate the transponder identity codes by either changing the reflectivity of their receiving antenna, or by reradiating a percentage of the received interrogation signal energy, modulated with the identification code, this data will be transferred on both frequencies for those tags which are illuminated by both interrogation signals simultaneously, and only on one frequency in the case of those transponders which are located in the null of one or the other interrogation signal. From this, the interrogator can recognise transponders responding on one or both frequencies.

Figure 4:
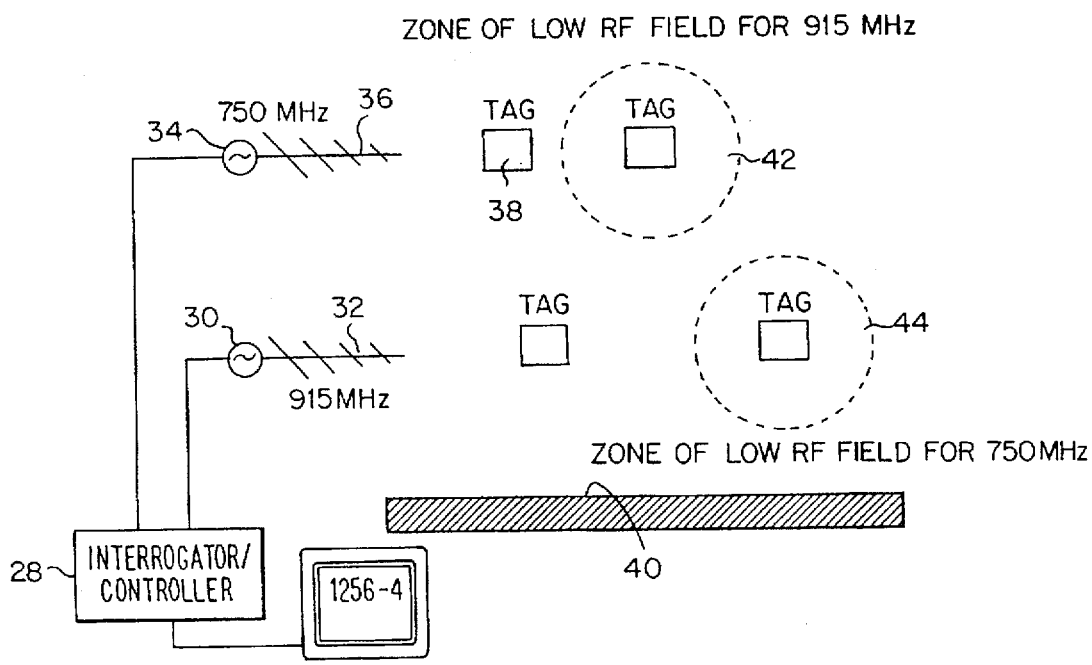
FIG. 4 is a schematic diagram of a second embodiment of the invention.

A system for implementing this embodiment of the invention is illustrated schematically in FIG. 4. In this system, the interrogator comprises an interrogator/controller unit 28, a first transmitter 30 with an associated antenna 32, and a second transmitter 34 with an associated antenna 36. Tags or transponders 38 are shown spaced about within an interrogation zone which is adjacent to a reflective surface 40. Nulls or areas of low RF field intensity 42 and 44 which are spaced apart from one another and do not overlap are shown schematically.

A number of practical applications of the present invention present themselves. In one application, the system is used in a supermarket to automate the check-out procedure, obviating the need for manual scanning or entry of prices using a cash register. In another application, the contents of a store room, warehouse or a truck, for example, can be determined without unloading or unpacking. In another application, articles such as books in a bookstore or library, or compact discs in a music store can be identified and counted, in an automated stock-taking process.

It will be appreciated that these examples are merely exemplary, and many other applications of the invention are possible.

A practical embodiment of the abovementioned supermarket check-out of the invention will now be described in more detail.

Figure 5:
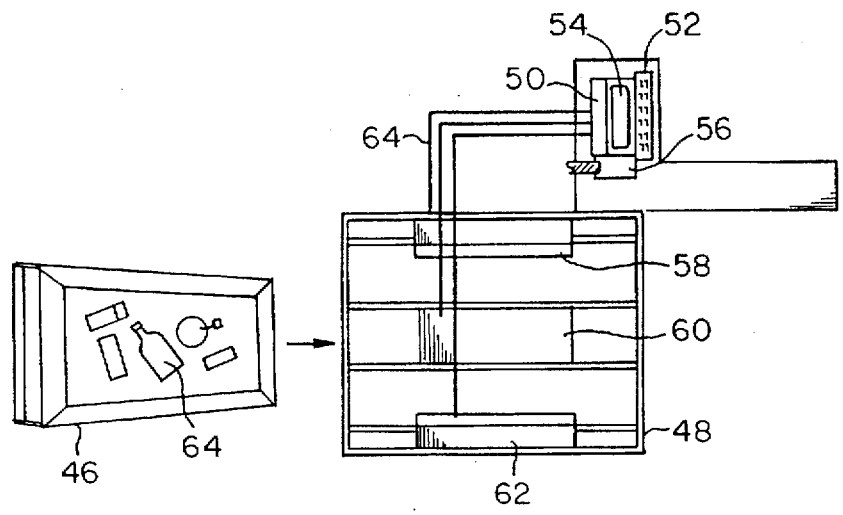
FIG. 5 is a schematic illustration of a practical embodiment of the invention at a supermarket checkout.

FIG. 5 shows an interrogator according to the invention which is installed at a supermarket checkout, and which is designed to scan the contents of a supermarket trolley 46 which is passed through an antenna unit 48 of the interrogator. The interrogator includes a till or control unit 50 which has a keyboard or keypad 52, a display 54 and an invoice printer 56. The interrogator/control unit 50 is operated by a cashier or check-out assistant, as in a conventional supermarket.

Figure 6:
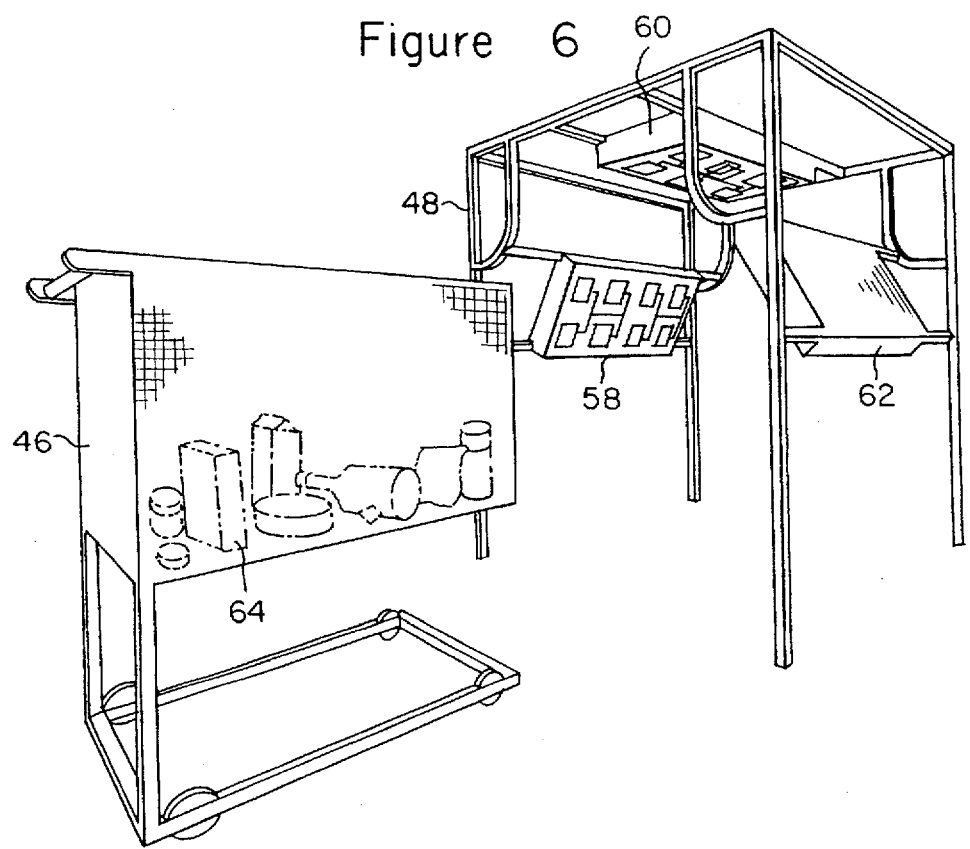
FIG. 6 is a pictorial view of an antenna assembly of the system of FIG. 5.

The antenna assembly 48 of the interrogator is shown pictorially in FIG. 6, and is seen to comprise a frame of welded tubular sections which supports three separate antenna units 58, 60 and 62.

The frame which supports the antenna units is sized so that the trolley 46 passes under the upper antenna unit 60 and between the left and right side antenna units 58 and 62, which are oriented to define an interrogation zone which is sufficiently large to cover the interior of the trolley as it is pushed past the antenna units. The antennas of the different antenna units are polarised differently from each other, to cater for the fact that articles in the interrogation zone may be oriented randomly, so that their transponder antennas will also be polarised randomly.

Inside the trolley are various articles 64 which are groceries including bottles, boxes and other containers, as well as larger items which may not be contained in a box or other container, but which are identified by means of a tag, sticker or label, for example.

Each article 64 in the trolley 46 has a transponder embedded therein or attached thereto, which has an identification code uniquely identifying the type of article to which it is attached. Articles of the same type are fitted with transponders having identical codes. A number of the articles in the trolley may be identical, and will therefore have transponders with identical codes.

The three antenna units 58, 60 and 62 operate at different frequencies. The left side antenna unit 58 operates at 915 MHz, the right side antenna unit 62 operates 910 MHz, and the upper antenna unit 60 operates at 920 MHz.

Each antenna unit 58, 60, 62 comprises a transmitting antenna and a receiving antenna. The transmitting and receiving antenna are identical. Each antenna is a microstrip patch array (see FIG. 7) comprising four square patches 66 which are interconnected. The transmitting and receiving antennas are E-plane polarised and in the prototype installation were formed on Diclad type GY870 printed circuit board material, which has a copper cladding with a thickness of 3.2 mm, and a substrate with a dielectric constant of 2.33 and a dissipation factor of 0.0012. The antenna patches 66 were 104 mm square, and each patch array was 406 mm square. FIG. 8 is an E-plane radiation pattern for the microstrip patch array at 915 MHz, showing its relatively directional characteristics.

Figure 9:
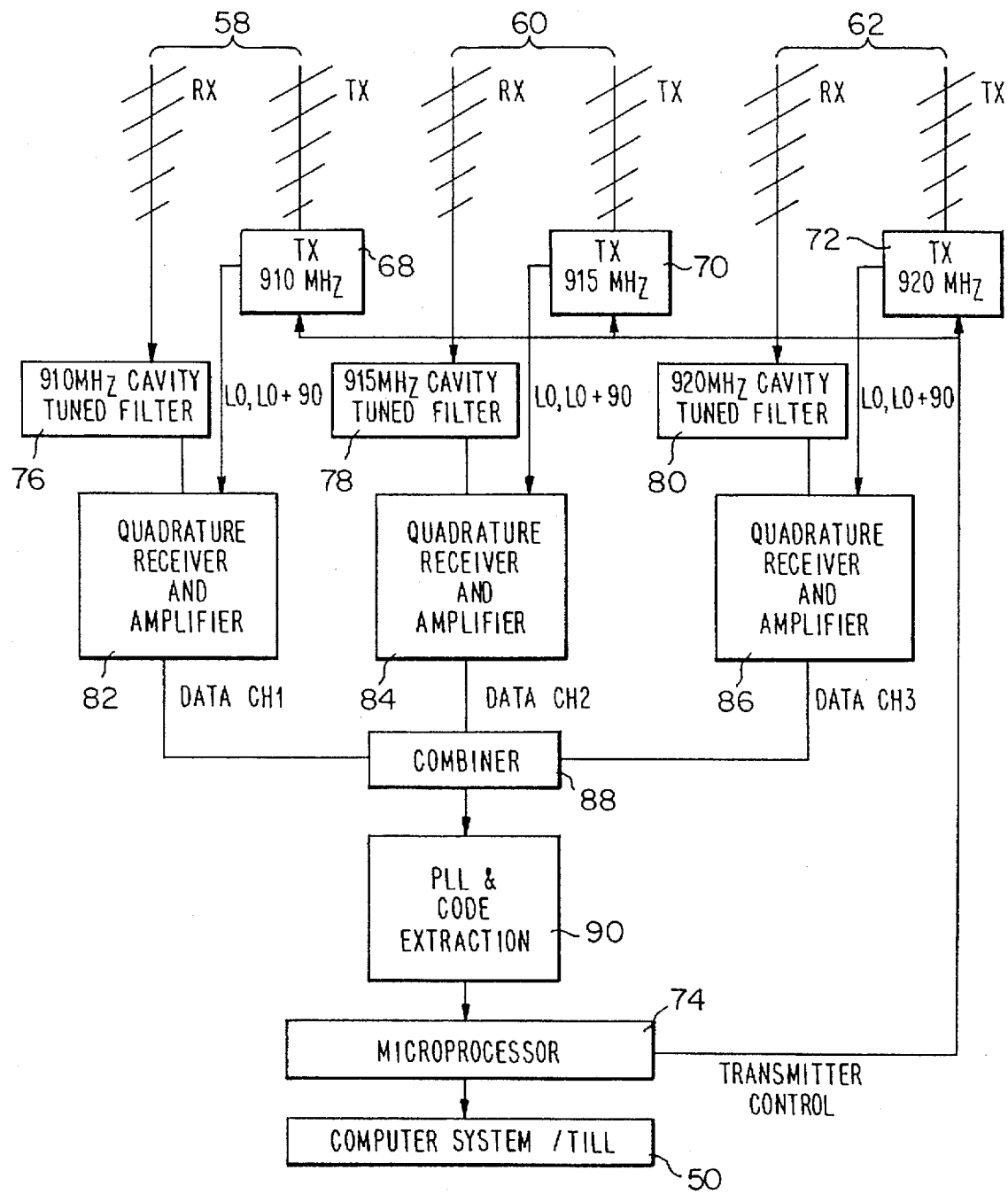
FIG. 9 is a block schematic diagram showing the overall electronic circuitry of the system of FIGS. 5 and 6.

FIG. 9 is an overall block diagram of the interrogator of the system, showing the antenna units, 58, 60 and 62 and their associated electronic circuitry. The transmitting antennas of each antenna unit 58, 60 and 62 are driven by respective transmitters 68, 70 and 72 which operate at centre frequencies of 910 MHz, 915 MHz and 920 MHz (that is, 5 MHz apart). The transmitters 68, 70 and 72 are controlled by transmitter control signals generated by a microprocessor-based control unit 74 which is linked to a central computer system or, in the present example, the till 50. The interrogation signals transmitted by each transmitter comprise a carrier signal (at the respective operating frequency of the transmitter) modulated by signals addressing particular transponders, particular groups or types of transponders, or all transponders.

The receiving antenna of each antenna unit 58, 60 and 62 is connected to a respective cavity tuned filter 76, 78, 80 which is tuned to the same frequency as the respective transmitter (that is, 910 MHz, 915 MHz or 920 MHz). The outputs of the filters 76, 78 and 80 are fed to respective quadrature receivers and amplifiers 82, 84, 86, together with signals from the respective transmitter which are derived from the local oscillator of the transmitter, and a 90° phase shifted version of the local oscillator signal. The respective quadrature receiver/amplifiers generate data output signals which are fed to a combiner circuit 88, which combines the data signals in a synchronised manner and which feeds a composite data signal to a phase locked loop and code extraction circuit 90, which extracts the codes contained in the received transponder signals and feeds them to the microprocessor 74.

The operation of the quadrature/receiver amplifiers 82, 84 and 86 is described below in greater detail with reference to FIG. 10, which is a block diagram of a single quadrature receiver/amplifier, and FIG. 11, which is a waveform diagram indicating the waveforms present at various points in the circuit of FIG. 10.

The transmitters 68, 70 and 72, the cavity tuned filters 76, 78 and 80, the quadrature reciever amplifiers 82, 84 and 86, and other associated RF components are housed in the housings of the respective antenna units 58, 60 and 62. The antenna units are connected to the combiner 88 and the microprocessor 74 in the housing of the till 50 by cables 64. The cables carry data between the antenna units and the control and processing circuitry of the interrogator, and also supply electrical power to the antenna units.

After being powered up by the received interrogation signals, the transponders attached to the articles 64 in the trolley 46 begin to respond, transmitting their own identification codes back to the interrogator by modulating the received interrogator carrier frequency, as described U.S. patent application Ser. No. 07/816,893. Because each transponder is a relatively wide band device, and has an antenna which is typically designed to receive signals from 800 MHz to 1 GHz, the transponders can respond to one or more of the signals transmitted by the respective antenna units, at their different frequencies. The transmitters of the interrogator must, of course, transmit at frequencies within the reception bandwidth of the transponder (in this case, at frequencies between 800 MHz and 1 GHz).

The circuitry of the transponder is designed to change the effective input impedance of the transponder circuit when the transponder is transmitting its identification code at its onboard oscillator clock rate (typically 10 kHz), thereby changing the termination and reflectivity of the transponder antenna accordingly. Thus, a portion of the received interrogation signal is reflected back to the interrogator antenna, modulated with the transponder's own output signal. In this mode of operation, it is possible that the interrogation signal from the interrogator can be received by the transponder at one, two or all three different frequencies used by the respective antenna units 58, 60 and 62, and the transponder will reflect a modulated signal back to each antenna unit at the different respective frequencies. It makes no difference to the operation of the transponder whether it is illuminated by one or more different frequencies, and the reflected signals at the respective different frequencies do not interfere with one another, due to the relatively narrow bandwidth of the antenna units 58, 60 and 62 and their associated circuitry, and because the data modulation bandwidth of the interrogation signals is typically selected to be between 10 kHz and 100 kHz, substantially less than the spacing between the different interrogation frequencies.

A transponder response signal received by any of the antenna units is fed via the respective receiving antenna and its associated cavity tuned filter to a mixer/filter circuit 92 where the received signal is mixed with a local oscillator signal obtained from the associated transmitter to extract the baseband transponder response signal. The mixer/filter circuit 92 includes a low pass filter to eliminate higher frequency products which result from different frequencies of adjacent interrogator transmitters. The output of the mixer/filter circuit 92 is a signal A (see FIG. 11) which is fed to a high pass filter 94, where code transitions in the transponder response signal are extracted by means of pseudo-differentiation. The response signal is indicated at B in FIG. 11.

The demodulated baseband transponder response signal A varies in strength as well as containing inherent low frequency noise due to the doppler shift of the interrogation signal carrier frequencies as objects move in the interrogation zone. The high pass filter 94 filters out the low frequency noise, passing only the relatively high frequency transitions of the code and effectively amplifying the resulting "spikes". These transition "spikes" are further amplified by an amplifier circuit 96, resulting in the amplified signal C of FIG. 11. The signal C is then passed through a full wave rectifier 98. The resulting full wave rectified signal is labelled D1. The received transponder response signal is passed through an identical receiver circuit, but the mixer/filter circuit 92' thereof is fed with a phase shifted version of the local oscillator signal which is 90° out of phase with the local oscillator signal fed to the mixer/filter circuit 92. The output of the duplicate receiver circuit is a full wave rectified signal D2.

The outputs of the full wave rectifier circuits 98 and 98' are added together in a summing circuit 100 to generate a composite waveform E. Where transitions or "spikes" occur together, the summed output is relatively large, while where only one weak signal occurs the summed output is relatively small. The purpose of the dual receiver arrangement is to deal with the situation where a received signal is not detected due to the received signal being exactly in phase with the local oscillator reference signal from the transmitter. By using an additional phase shifted local oscillator signal in a duplicate receiver channel, at least one of the signals D1 or D2 will generate a strong output from a received signal.

The output of the summing circuit 100 is fed to an amplifier 102, which feeds the amplified combined signal to a noise limiter circuiter 104 which is set to generate output clock pulses when it receives input pulses above a reference threshold. These clock pulses are fed to a D-type flipflop 106 which generates an output F, which is the received Manchester code format signal received from the transponder. The codes of the transponder response signals are so arranged that the first bit of a transponder message is always a Manchester "1", which corresponds with the format of the codes which are regenerated by the flipflop 106.

In the waveform diagram of FIG. 11, the waveforms D1 and D2 correspond to signals received from a transponder which are slightly different in amplitude. When summed together to produce signal E, the "spikes" of the signals D1 and D2 are added to become relatively strong signals. If the signals are sufficiently large in amplitude to exceed a threshold 108 of the noise limiter circuit 104, a Manchester code output transition F is generated.

Each of the antenna units and its respective transmitter and receiver circuitry operates similarly, so that each of the quadrature receiver/amplifiers 82, 84 and 86 can pick up a response signal from a transponder, using its own interrogation frequency and its own antenna polarisations.

In this regard, the situation can arise that articles which are placed in the trolley 46 have transponders with antennas which are polarised differently, due to being tossed in the trolley into a random manner. In the case of articles packed in a truck or a storeroom, the articles might be packed in a consistent manner, but the antennas of the transponders on the articles might be horizontally polarised, whereas a single interrogator antenna might be vertically polarised and would therefore not "see" the transponders. However, in the illustrated arrangement, the use of three different operating frequencies, together with differently polarised antennas, ensures that the transponders within the trolley are generally illuminated by at least two different interrogation frequencies simultaneously, if not all three.

Metallic objects such as tin cans within the trolley can partially screen the trolley contents from one of the antenna units. However, in most cases the other two antenna units will normally illuminate the transponders in question. If the polarisation of one of these antenna units is incorrect for the transponder in question, the remaining antenna unit should detect the transponder. Obviously, it is conceivable that the situation could arise where a transponder was completely shielded from all three of the antenna units. However, this is unlikely in practice. In situations where it is vital to identify all of the articles in an interrogation zone, further antenna units could be provided.

In the example described above, for example, a further antenna unit could be provided below the trolley, either in addition to or instead of the upper antenna unit. The antenna assembly could define a bay in which the trolley is temporarily "parked", instead of a "tunnel" through which the trolley is pushed. This would facilitate placing a further antenna unit at the inner end of the bay.

The Manchester code data which is generated by each quadrature receiver/amplifier 82, 84 and 86 is fed to a combiner circuit 88 which comprises a circuit which adds the three incoming waveforms in an analogue style to form a single combined response signal. The circuit is followed by a comparator and a single flipflop, for regenerating a single Manchester code as described previously. The output of the combiner circuit 88 is therefore a Manchester code containing 64 bits of information and always starting with a "1".

The output of the combiner circuit is fed to the phase locked loop circuit 90 and to the microprocessor 74, which extracts the information from the received code as described in U.S. patent application Ser. No. 08/111,430. The microprocessor extracts the transponder identification code from the received signal, verifies that the code is a valid number by means of parity checking or CRC checking, and processes the number according to the relevant application.

If the microprocessor 74 decides that a transponder has been validly identified, whether on only one or on two or more interrogation frequencies, the transmitters 68, 70 and 72 are instructed synchronously to modify their respective interrogation signals, for example by interrupting their output signals completely or by reducing their output power by a predetermined amount, a certain time after successful reception of the transponder response signal. This process is carded out in accordance with the system described in U.S. patent application Ser. No. 08/111,430, the contents of which are incorporated herein by reference.

In the situation where one of the receiver circuits receives a response signal from one transponder which is not "heard" by the other two antennas, while those antennas at the same time receive signals from another transponder, the signals added together in the combiner will not be of the correct bit length or contain the correct valid code and as a result will be ignored. Frequently, the transmissions from individual transponders will be "jammed" by overlapping transmissions from other transponders, so that the received signals will not pass one or other of the checking/verification steps. However, when a transponder signal is received during a "quiet" period when other transponders are not transmitting simultaneously, it will be verified, and the resulting data is fed to the microprocessor 74 for identification and counting of the article to which the transponder is attached.

The above described system exploits the fact that low cost transponders of the kind in question use wide tolerance components, which allow good yields in manufacture. These transponders do not include tuned circuits and comprise a single integrated circuit produced in a conventional integrated circuit foundry. The antenna of the transponder determines its frequency response characteristics, and can be designed for a relatively wide bandwidth. These transponders can then be interrogated on several different frequencies simultaneously, using relatively narrow bandwidth interrogator transmit/receive antennas, so that the transponders modulate one or several interrogation signals simultaneously when transmitting a response.

When all of the transponders in the trolley 46 have been successfully identified, which can typically take less than one second, the microprocessor 74 passes the data to the till 50, which generates a print out which can take the form of the sample print out shown in FIG. 12, by associating the received transponder codes with information in a price look-up table. The nature of each article in the trolley is indicated, as well as the price per article, the number of articles, the subtotal, and the total price of all the articles in the trolley. The microprocessor 74 or the till 50 itself can store the price look-up data, which can be updated periodically, for example daily. Alternatively, the microprocessor 74 or the till 50 can be connected online to a central computer, which provides updated price look-up data on an ongoing basis.

The information in the sample print out of FIG. 12 can be displayed on the screen 54 of the till 50, and is reflected on a paper print out generated by the printer 56, which serves as the customer's receipt. Payment can be made by the customer in a conventional manner. However, the automatic generation of a receipt by the described system lends itself to automatic billing of clients who have an account with the retailer in question.

A further application of the present invention is illustrated in FIGS. 13 and 14. This embodiment of the invention can be applied in stock taking, for example in a book store or a store selling compact discs and cassettes. In such an application, each item of stock in the store, whether it be a book, a compact disc or a cassette, has a transponder fixed to it which identifies the article in question. Using the identification system described in U.S. patent application Ser. Nos. 07/816,893 and 08/111,430, and using a hand-held interrogator unit or scanner, the articles can be interrogated, and will be identified and counted. As the transponder of each article communicates successfully with the interrogator, it receives a turn-off instruction and shuts down. After a while, the shut-down transponders reset themselves and are ready to respond againto an interrogation signal.

A problem may arise in that transponders which have already been interrogated and shut down are reset in this way, and are then accidentally re-illuminated by the beam of the interrogator, so that they are recounted, resulting in stock taking errors. To deal with this possible problem, a hand-held interrogator 108 is provided which transmits a first, narrow interrogator beam (beam 1) and a second wide angle inhibiting beam (beam 2) simultaneously, at different frequencies. The interrogating beam (beam 1) typically has a beam width of approximately 15 cm at its maximum operating range of 4 m, and is transmitted at a frequency of 915 MHz, and at a power of 6 watts. The inhibiting beam (beam 2) is much broader or more widely dispersed, and has a beam width of approximately 4 m at the same operating distance. The ratio between the width of the inhibiting beam and the interrogating beam is at least 5 to 1, and preferably greater than 10 to 1. In the above example, the ratio is greater than 20 to 1. The inhibiting beam is transmitted at a lower power, typically 3 watts, and at a different frequency (in the prototype system, at 900 MHz).

FIG. 14 shows, in a simplified schematic diagram, part of the circuitry used by the hand-held interrogator 108. The circuitry includes a 915 MHz transmitter 110 with a directional transmitting antenna 112 which transmits the interrogating beam (beam 1). The interrogator includes a directional receiving antenna 114 (which may be separate or which may be the same antenna as the antenna 112) which feeds a receiver 116 with received transponder response signals, which are fed to the decoding and control circuitry 118 of the interrogator. This circuitry also controls a second transmitter 120 which an associated antenna 122 which is less directional than the antenna 112, to transmit the inhibiting beam (beam 2).

Due to the higher power and narrower beam width of the interrogating beam (beam 1), this beam provides sufficient power to the transponders illuminated by it to power them up and to cause them to transmit response signals. The inhibiting beam (beam 2) has a lower power and is transmitted over a much greater volume, so that its power is normally insufficient to activate transponders which are currently inactive. However, it transmits sufficient power to prevent successfully detected, disabled transponders from powering down completely, thus preventing them from resetting when the interrogation beam (beam 1) moves away from them.

Transponders which are very close to the interrogator unit 108 may receive sufficient power from the inhibiting beam to be powered up and to transmit response signals as a result. However, these response signals will comprise the 900 MHz carrier of the inhibiting beam, modulated with the transponder response code, which will not be detected by the 915 MHz narrow band receiving antenna 114.

When a transponder is successfully detected, the control circuit 118 generates a "gap" or turn-off signal which is applied to both the transmitter 110 and the inhibiting transmitter 120, so that the outputs of both transmitters are briefly interrupted to turn off the relevant transponder. The turn-off signal is applied to the transmitter 120 as well, to cater for the possibility that the inhibiting beam (beam 2) is sufficiently strong due to the closeness of the transponder to the interrogator 108, to prevent the transponder from turning off as intended.

It can be seen that the above described system also exploits the relative frequency insensitivity of the transponders to provide a more accurate reading or interrogation operation.

It is not essential that the inhibiting beam or signal be transmitted from the portable interrogator 108. In some installations, it may be convenient to provide a completely separate transmission system for the inhibiting signal.

We claim:

1. An identification system comprising:
   an interrogator; and
   a plurality of transponders;
   the interrogator comprising:
      transmitter means for transmitting an interrogation signal to a plurality of transponders,
      receiver means for receiving a respective plurality of response signals from the plurality of transponders, and
      means for identifying the plurality of transponders from the respective plurality of response signals,
      the interrogator being capable of disabling any of the plurality of transponders;
   each of the plurality of transponders comprising:
      receiving means, and
      transmitting means,
      whereby, on receipt of the transmitted interrogation signal, the transponder transmits a response signal;
   wherein the interrogator transmits at least two intermittent interrogation signals, with an interval between successive interrogation signals which is less than a minimum period within which transponders which have been disabled reset themselves automatically.

2. An identification system according to claim 1, wherein:
   the interrogation signals have respective different frequencies which are selected to fall within a reception bandwidth of the receiving means of the transponders.

3. An identification system according to claim 2, wherein:
   the interrogation signals are relatively narrow bandwidth signals; and
   the receiving means of each transponder has a relatively broad reception bandwidth within which the respective different frequencies of the interrogation signals fall;
   whereby the respective transponder is responsive to any one or more of the at least two intermittent interrogation signals.

4. An identification system according to claim 3, wherein:
   each of the interrogation signals is modulated with data, a data modulation bandwidth of each interrogation signal being less than a spacing between the respective different frequencies of the interrogation signals.

5. An identification system according to any one of claim 1 to 4, wherein the transmitting means of the transponder comprises:
   an antenna; and
   means for modulating the reflectivity of the antenna;
   the response signal of the transponder comprising at least one interrogation signal carrier modulated with data which identifies the transponder.

6. An identification system according to any one of claim 1 to 4, wherein:
   the transmitter means of the interrogator comprises at least two spaced apart transmitting antenna elements; and
   the receiver means comprises at least two spaced apart receiving antenna elements.

7. An identification system according to any one of claim 1 to 4, wherein:
   the transmitter means and the receiver means comprise at least two spaced apart antenna units, each of the at least two spaced apart antenna units comprising:
      a transmitting antenna element, and
      an adjacent receiving antenna element.

8. An identification system according to claim 7, wherein:
   each antenna element comprises a patch array designed to operate at a frequency between 800 MHz and 1 GHz.

9. An identification system according to claim 7, wherein:
   at least two of the respective transmitting and receiving antenna elements are polarized differently from one another.

10. An identification system according to claim 7, wherein the transmitting means of the interrogator comprises:
    a transmitting antenna element;
    at least first and second transmitters for generating interrogation signals at respective different frequencies; and
    switch means for switching the outputs of the transmitters alternately to the transmitting antenna element.

11. An identification system according to any one of claims 1 to 4, wherein:

the transmitter means and the receiver means of the interrogator are mounted on or adjacent to a structure which defines an interrogation zone through which the transponders to be identified may be passed.

12. An identification system according to claim 11, wherein:

the transmitter means and the receiver means of the interrogator are supported by a frame defining a passage through which a conveyance containing articles to which respective transponders are attached can pass.

13. An identification system according to any one of claims 1 to 4, wherein:

the at least two interrogation signals have respective different frequencies which are selected so that there are no overlapping nulls in the electric fields of the interrogation signals within a predetermined distance of the transmitter means of the interrogator.

14. An identification system according to any one of claims 1 to 4, further comprising:

processor means for recording data received from each identified transponder, and for relating the received data to stored data corresponding to the received data.

15. An identification system according to claim 14, wherein:

the processor means stores at least one of price data and identification data of articles to which different transponders are attached, and relates the identification codes of identified transponders thereto.

16. An identification system according to claim 15, further comprising:

display means for generating a display in which descriptions of the articles to which respective transponders are attached are associated with price data.

17. An identification system according to claim 16, further comprising:

printer means for generating a printout of the display.

18. A method of identifying a plurality of transponders, comprising:

transmitting an interrogation signal to the transponders, each transponder receiving the interrogation and transmitting a response signal in response;

receiving the response signals from the transponders;

identifying a particular transponder from the response signals; and disabling the particular transponder;

wherein at least two intermittent interrogation signals are transmitted, with an interval between successive interrogation signals which is less than a minimum period within which transponders which have been disabled reset themselves automatically.

19. A method according to claim 18, further comprising:

selecting the respective different frequencies of the at least two interrogation signals to fall within the reception bandwidth of the transponders.

20. A method according to claim 19, wherein:

the at least two interrogation signals have a relatively narrow bandwidth and the transponders have a relatively broad reception bandwidth within which the respective different frequencies of the at least two interrogation signals fall.

21. A method according to claim 20, wherein:

each interrogation signal is modulated with data, the data modulation bandwidth of each interrogation signal being less than the spacing between the respective different frequencies of the interrogation signals.

22. A method according to any one of claims 18 to 21, wherein:

the response signal from a transponder comprises one or more interrogation signal carriers modulated with data which identifies the transponder.

23. A method according to any one of claims 18 to 21, further comprising:

switching between the at least two interrogation signals.

24. A method according to any one of claims 18 to 21, further comprising:

selecting the at least two interrogation signals to have respective different frequencies so that there are no overlapping nulls in the electric fields of the interrogation signals within a predetermined distance of the transmitter means of the interrogator.

25. A method according to any one of claims 18 to 21, further comprising:

recording data received from each identified transponder; and relating the received data to stored data corresponding to the received data.

26. A method according to claim 25, further comprising:

storing at least one of price data and identification data of articles to which different transponders are attached; and relating thereto the identification codes of identified transponders.

27. A method according to claim 26, further comprising:

displaying descriptions of the articles to which respective transponders are attached; and associating the articles with the price data.

28. A method according to claim 27, further comprising:

printing a printout of the display.

29. An identification system comprising:

an interrogator; and a plurality of transponders;

the interrogator comprising:

transmitter means for transmitting an interrogation signal to the transponders, receiver means for receiving response signals from the transponders, and means for identifying the transponders from the response signals;

each of the plurality of transponders comprising:

receiving means, and transmitting means, whereby, on receipt of the transmitted interrogation signal, the transponder transmits a response signal;

wherein the interrogator transmitter transmits a plurality of simultanteous interrogation signals at a plurality of frequencies, each transponder transmiting a response signal on receipt of at least one of whichever of the interrogation signals, and the interrogator identifying response signals from the same transponder which are transmitted at some or all of the frequencies.

30. An identification system according to claim 29, wherein:

the transmitter means transmits the plurality of interrogation signals continuously.

31. An identification system according to claim 29 or claim 30, wherein:

the interrogation signals have respective different frequencies which are selected to fall within the reception bandwidth of the receiving means of the transponders.

32. An identification system according to claim 31, wherein:

the interrogation signals are relatively narrow bandwidth signals; and the receiving means of each transponder have a relatively broad reception bandwidth within which the respective different frequencies of the interrogation signals fall;

whereby the transponder is responsive to at least one of the interrogation signals.

33. An identification system according to claim 32, wherein:

each interrogation signal is modulated with data, the data modulation bandwidth of each interrogation signal being less than the spacing between the respective different frequencies of the interrogation signals.

34. An identification system according to any one of claims 29 to 32, wherein the transmitting means of the transponder comprises:

an antenna; and means for modulating the reflectivity of the antenna;

whereby the response signal of the transponder comprises one or more interrogation signal carriers modulated with data which identifies the transponder.

35. An identification system according to any one of claims 29 to 32, wherein:

the transmitter means and the receiver means comprise at least two spaced apart antenna units, each antenna unit comprising a transmitting antenna element and an adjacent receiving antenna element.

36. An identification system according to any one of claims 29 to 32, wherein:

the interrogation signals have respective different frequencies which are selected so that there are no overlapping nulls in the electric fields of the interrogation signals within a predetermined distance of the transmitter means of the interrogator.

37. An identification system according to any one of claims 29 to 32, wherein:

the transmitter means and the receiver means of the interrogator are mounted on or adjacent to a structure which defines an interrogation zone through which the transponders to be identified may be passed.

38. An identification system according to claim 37, wherein:

the transmitter means and the receiver means of the interrogator are supported by a frame defining a passage through which a conveyance containing articles to which respective transponders are attached can pass.

39. An identification system according to any one of claims 29 to 32, wherein:

the transmitter means of the interrogator comprises at least two spaced apart transmitting antenna elements; and the receiver means comprises at least two spaced apart receiving antenna elements.

40. An identification system according to claim 39, wherein:

each antenna element comprises a patch array designed to operate at a frequency between 800 MHz and 1 GHz.

41. An identification system according to claim 39, wherein:

at least two of the respective transmitting and receiving antenna elements are polarized differently from one another.

42. An identification system according to claim 39, wherein:

the receiver means distinguishes response signals from transponders in response to interrogation signals transmitted at the respective different frequencies of the at least first and second transmitters.

43. An identification system according to claim 42, further comprising:

processor means to detect duplicate transponder response signals transmitted on two or more of the respective different frequencies.

44. An identification system according to claim 42, further comprising:

processor means for disregarding transponder response signals transmitted on two or more of the respective different frequencies.

45. An identification system according to any one of claims 29 to 32, further comprising:

processor means for recording data received from each identified transponder, and for relating the received data to stored data corresponding to the received data.

46. An identification system according to claim 45, wherein:

the processor means stores at least one of price data and identification data of articles to which different transponders are attached, and relates the identification codes of identified transponders thereto.

47. An identification system according to claim 46, further comprising:

display means for generating a display in which descriptions of the articles to which respective transponders are attached are associated with price data.

48. An identification system according to claim 47, further comprising:

printer means for generating a printout of the display.

49. An interrogator for identifying a plurality of transponders, the interrogator comprising:

transmitter means for transmitting an interrogation signal to the transponders;

receiver means for receiving response signals from the transponders; and means for identifying transponders from the response signals;

wherein the interrogator transmitter transmits a plurality of simultaneous interrogation signals at a respective plurality of frequencies, and the interrogator identifies a plurality of respectively distinguishable response signals from the same transponder which are transmitted at some or all of the frequencies.

50. An interrogator according to claim 49, further comprising:

processor means for detecting duplicate transponder response signals transmitted on two or more of the respective different frequencies.

51. An interrogator according to claim 49, further comprising:

processor means for disregarding transponder response signals transmitted on two or more of the respective different frequencies.

52. An interrogator according to claim 49, wherein:

the transmitter means of the interrogator transmits the plurality of interrogation signals continuously.

53. An interrogator according to claim 49 or claim 52, wherein:

the transmitter means and the receiver means comprise at least two spaced apart antenna units, each antenna unit comprising:

a transmitting antenna element, and
an adjacent receiving antenna element.

54. An interrogator according to claim 49 or claim 52, wherein:

the interrogation signals have respective different frequencies which are selected so that there are no overlapping nulls in the electric fields of the interrogation signals within a predetermined distance of the transmitter means of the interrogator.

55. An interrogator according to claim 49 or claim 52, wherein the transmitter means of the interrogator comprises:

at least two spaced apart transmitting antenna elements; and the receiver means comprises at least two spaced apart receiving antenna elements.

56. An interrogator according to claim 55, wherein each antenna element comprises:

a patch array designed to operate at a frequency between 800 MHz and 1 GHz.

57. An interrogator according to claim 55, wherein:

at least two of the respective transmitting and receiving antenna elements are polarized differently from one another.

58. An interrogator according to claim 55, wherein:

the receiver means distinguishes response signals from transponders transmitted at the respective different frequencies of the at least first and second transmitters.

59. An interrogator according to claim 49 or claim 52, wherein:

the transmitter means and the receiver means of the interrogator are mounted on or adjacent to a structure which defines an interrogation zone.

60. An interrogator according to claim 59, wherein:

the transmitter means and the receiver means of the interrogation are supported by a frame defining a passage through which a conveyance containing articles can pass.

61. An interrogator according to claims 49 or claim 52, wherein:

the interrogation signals have respective different frequencies.

62. An interrogator according to claim 61, wherein:

the interrogation signals are relatively narrow bandwidth signals.

63. An interrogator according to claim 62, wherein:

each interrogation signal is modulated with data, the data modulation bandwidth of each interrogation signal being less than the spacing between the respective different frequencies of the interrogation signals.

64. An interrogator for identifying a plurality of transponders, comprising:

transmitter means for transmitting an interrogation signal to the transponders;

receiver means for receiving response signals from the transponders; and means for identifying the transponders from the response signals;

the interrogator being capable of disabling any transponder; and the interrogator transmitter transmitting at least two intermittent interrogation signals, with an interval between successive interrogation signals which is less than a minimum period within which transponders which have been disabled reset themselves automatically.

65. An interrogator according to claim 64, wherein:

the transmitter means and the receiver means comprise at least two spaced apart antenna units, each antenna unit comprising a transmitting antenna element and an adjacent receiving antenna element.

66. An interrogator according to claim 64, wherein the transmitting means of the interrogator comprises:

a transmitting antenna element;

at least first and second transmitters for generating interrogation signals at respective different frequencies; and switch means for switching the outputs of the transmitters alternately to the transmitting antenna element.

67. An interrogator according to claim 64, wherein:

the at least two interrogation signals have respective different frequencies which are selected so that there are no overlapping nulls in the electric fields of the interrogation signals within a predetermined distance of the transmitter means of the interrogator.

68. An interrogator according to claim 64, wherein:

the transmitter means of the interrogator comprises at least two spaced apart transmitting antenna elements; and the receiver means comprises at least two spaced apart receiving antenna elements.

69. An interrogator according to claim 68, wherein:

each antenna element comprises a patch array designed to operate at a frequency between 800 MHz and 1 GHz.

70. An interrogator according to claim 68, wherein:

at least two of the respective transmitting and receiving antenna elements are polarized differently from one another.

71. An interrogator according to claim 64, wherein:

the transmitter means and the receiver means of the interrogator are mounted on or adjacent to a structure which defines an interrogation zone.

72. An interrogator according to claim 71, wherein:

the transmitter means and the receiver means of the interrogator are supported by a frame defining a passage through which a conveyance containing articles can pass.

73. An interrogator according to claim 64, wherein:

the at least two interrogation signals have respective different frequencies.

74. An interrogator according to claim 73, wherein:

the at least two interrogation signals are relatively narrow bandwidth signals.

75. An interrogator according to claim 74, wherein:

each interrogation signal is modulated with data, a data modulation bandwidth of each interrogation signal being less than a spacing between the respective different frequencies of the interrogation signals.

76. A method of identifying a plurality of transponders, comprising:

transmitting an interrogation signal to the plurality of transponders, each of the plurality of transponders receiving the interrogation signal and transmitting a signal in response;

receiving the response signals from the transponders; and identifying transponders from the response signals;

wherein a plurality of simultaneous interrogation signals at a plurality of frequencies are transmitted, a response signal is transmitted by each transmitter on receipt of at least one of whichever of the interrogation signals, and response signals from the same transponder which are transmitted at some or all of the frequencies are identified.

77. A method according to claim 76, further comprising:
detecting duplicate transponder response signals transmitted on at least two of the respective different frequencies.

78. A method according to claim 76, further comprising:
disregarding transponder response signals transmitted on at least two of the respective different frequencies.

79. A method according to claim 76, wherein:
a plurality of interrogation signals are transmitted continuously.

80. A method according to claim 76 or claim 79, wherein:
the response signal of a transponder comprises at least one interrogation signal carrier modulated with data which identifies the transponder.

81. A method according to claim 76 or claim 79, further comprising:
selecting the interrogation signals to have respective different frequencies so that there are no overlapping nulls in the electric fields of the interrogation signals within a predetermined distance of the transmitter means of the interrogator.

82. A method according to claim 79, wherein:
respective different frequencies of the interrogation signals are selected to fall within the reception bandwidth of the transponders.

83. A method according to claim 82, wherein:
the interrogation signals have relatively narrow bandwidth; and
the transponders have a relatively broad reception bandwidth within which the respective different frequencies of the interrogation signals fall.

84. A method according to claim 83, wherein:
each interrogation signal is modulated with data, the data modulation bandwidth of each interrogation signal being less than a spacing between respective different frequencies of the interrogation signals.

85. A method according to claim 76 or claim 79, further comprising:
recording data received from each identified transponder; and
relating the received data to stored data corresponding to the received data.

86. A method according to claim 85, further comprising:
storing at least one of price data and identification data of articles to which different transponders are attached; and
relating thereto the identification codes of identified transponders.

87. A method according to claim 86, further comprising:
displaying descriptions of the articles to which respective transponders are attached; and
associating the articles with price data.

88. A method according to claim 87, further comprising:
printing a printout of the display.

89. A method of identifying a plurality of transponders, comprising:
transmitting an interrogation signal to the plurality of transponders, each of the plurality of transponders receiving the interrogation signal; and
disabling any one of the plurality of transponders;
whereby the interrogation signal and an inhibiting signal are transmitted; and
a disabled transponder remains disabled while the disabled transponder continues receiving the inhibiting signal.

90. A method according to claim 89, wherein:
the interrogation signal and the inhibiting signal have relatively narrow bandwidth; and
the transponders have a relatively broad reception bandwidth within which the respective different frequencies of the interrogation signal and the inhibiting signal fall.

91. A method according to claim 90, further comprising:
modulating the interrogation signal with data, the data modulation bandwidth of the interrogation signal being less than a spacing between the respective different frequencies of the interrogation signal and the inhibiting signal.

92. A method according to claim 89, wherein:
the interrogation signal is relatively directional; and
the inhibiting signal is relatively widely dispersed.

93. A method according to claim 89, wherein:
a width of the inhibiting signal is at least 5 times greater than a width of the interrogating signal.

94. A method according to any one of claims 89 to 93, wherein:
the interrogation signal is relatively high power; and
the inhibiting signal is relatively low power.

95. A method according to any one of claims 89 to 93, further comprising:
transmitting a turn-off instruction in both the interrogation signal and the inhibiting signal.

96. A method according to any one of claims 89 to 93, further comprising:
selecting respective different frequencies of the interrogation signal and the inhibiting signal to fall within the reception bandwidth of the transponders.

97. A method according to any one of claims 89 to 93, wherein:
the response signal of a transponder comprises a interrogation signal carrier modulated with data which identifies the transponder.

98. A method according to any one of claims 89 to 93, further comprising:
selecting the interrogation signal and the inhibiting signal to have respective different frequencies so that there are no overlapping nulls in the electric fields of the interrogation signals within a predetermined distance of the transmitter means of the interrogator.

99. A method according to any one of claims 89 to 93, further comprising:
disregarding transponder response signals transmitted on the frequency of the inhibiting beam.

100. A method according to any one of claims 89 to 93, further comprising:
recording data received from each identified transponder; and
relating the received data to stored data corresponding to the received data.

101. A method according to claim 100, further comprising:
storing at least one of price data and identification data of articles to which different transponders are attached; and
relating thereto the identification codes of identified transponders.

102. A method according to claim 101, further comprising:
displaying descriptions of the articles to which respective transponders are attached; and associating the articles with the price data.

103. A method according to claim 102, further comprising:

printing a printout of the display.

104. A transponder comprising:

receiving means for receiving an interrogation signal;

a code generator; and transmitting means connected to the code generator, the transponder transmitting a response signal which identifies the transponder on receipt of the interrogation signal, and being disabled by an instruction in the interrogation signal;

the transponder receiving the interrogation signal and an inhibiting signal; and a disabled transponder remaining disabled while the disabled transponder continues receiving the inhibiting signal.

105. A transponder according to claim 104, wherein the transmitting means of the transponder comprises:

an antenna; and means for modulating reflectivity of the antenna;

whereby the response signal of the transponder comprises an interrogation signal carrier modulated with data which identifies the transponder.

106. An identification system comprising:

a plurality of transponders, each transponder comprising receiving means, a code generator, and transmitting means connected to the code generator, wherein in each transponder the transmitting means transmits a response signal containing data from the code generator which identifies the transponder in response to whichever of two independent interrogation signals the receiving means of the transponder receives; and an interrogator comprising transmitter means for transmitting two independent interrogation signals to the transponders wherein each independent interrogation signal being adapted to independently activate any one or more of the transponders, receiver means for receiving the response signals from the transponders, and processor means for identifying the transponders from data in the response signals.

107. A system as in claim 106, wherein the transmitter means of the interrogator transmits the two independent interrogation signals simultaneously.

108. A system as in claim 106, wherein the transmitter means of the interrogator transmits the two interrogation signals intermittently, with an interval between successive interrogation signals which is less than a minimum period within which transponders which have been disabled by a disable instruction in an interrogation signal reset themselves automatically.

109. A system as in claim 106, wherein the two interrogation signals have respective different frequencies which fall within the reception bandwidth of the transponders.

110. A method for identifying one of a plurality of transponders, the method comprising:

transmitting two independent interrogation signals to the transponders, each independent interrogation signal being adapted to independently activate any one or more of the transponders;

activating one of the transponders in response to whichever of the two independent interrogation signals the one transponder receives, such that the one transponder transmits a response signal containing code data which identifies the transponder and at least some signal energy from whichever of the two independent interrogation signals the one transponder receives;

receiving the response signal from the one transponder; and identifying the one transponder from the code data in the response signal.

111. A method as in claim 110, wherein the step of transmitting two independent interrogation signals comprises simultaneously transmitting the two independent interrogation signals.

112. A method as in claim 110, wherein the step of transmitting two independent interrogation signals comprises transmitting the two independent interrogation signals intermittently, with an interval between successive interrogation signals which is less than a minimum period within which transponders remain disabled responsive to a disable instruction before an automatic reset.

113. A method as in claim 110, wherein the two independent interrogation signals have respective different frequencies which fall within a reception bandwidth of the transponders.

114. A method as in claim 113, wherein the frequencies of the two independent interrogation signals are such that electric fields of the two transmitted independent interrogation signals have no overlapping nulls in an area encompassing the transponders.

115. An identification system comprising:

an interrogator; and a plurality of transponders;

the interrogator comprising:

transmitter means for transmitting an interrogation signal to the transponders, receiver means for receiving response signals from the transponders, and means for identifying the transponders from the response signals;

each of the plurality of transponders comprising:

receiving means responsive to a disabling instruction from the interrogator;

the interrogator transmiting the interrogation signal and an inhibiting signal; and a disabled transponder remains disabled while the disabled transponder continues receiving the inhibiting signal.

116. An identification system according to claim 115, wherein:

the interrogation signal and the inhibiting signal are relatively narrow bandwidth signals; and the receiving means of each transponder has a relatively broad reception bandwidth within which the respective different frequencies of the interrogation signal and the inhibiting signal fall.

117. An identification system according to claim 116, wherein:

the interrogation signal is modulated with data, the data modulation bandwidth of the interrogation signal being less than a spacing between respective different frequencies of the interrogation signal and the inhibiting signal.

118. An identification system according to claim 115, wherein:

the interrogation signal is a relatively directional signal; and the inhibiting signal is a relatively widely dispersed signal.

119. An identification system according to claim 118, wherein:

the inhibiting signal has a beam width which is at least 5 times greater than that of the interrogating signal.

120. An identification system according to any one of claims 115 to 119, wherein:

the interrogation signal is a relatively high power signal; and the inhibiting signal is a relatively low power signal.

121. An identification system according to any one of claims 115 to 119, wherein:

a turn-off instruction to the transponder is transmitted in both the interrogation signal and the inhibiting signal.

122. An identification system according to any one of claims 115 to 119, wherein:

the interrogation signal and the inhibiting signal have respective different frequencies which are selected to fall within the reception bandwidth of the receiving means of the transponders.

123. An identification system according to any one of claims 115 to 119, wherein the transmitting means of the transponder comprises:

an antenna; and means for modulating the reflectivity of the antenna;

whereby the response signal of the transponder comprises the interrogation signal carrier modulated with data which identifies the transponder.

124. An identification system according to any one of claims 115 to 119, wherein:

the interrogator detects transponder response signals transmitted on a frequency of the inhibiting beam and disregards such transponder response signals.

125. An identification system according to any one of claims 115 to 119, further comprising:

processor means for recording data received from each identified transponder, and for relating the received data to stored data corresponding to the received data.

126. An identification system according to claim 125, wherein:

the processor means stores at least one of price data and identification data of articles to which different transponders are attached, and to relate the identification codes of identified transponders thereto.

127. An identification system according to any one of claims 115 to 119, wherein:

the interrogation signal and the inhibiting signal have respective different frequencies selected so that there are no overlapping nulls in the electric fields of the interrogation signals within a predetermined distance of the transmitter means of the interrogator.

128. An identification system according to claim 127, further comprising:

display means for generating a display in which descriptions of the articles to which respective transponders are attached are associated with price data.

129. An identification system according to claim 128, further comprising:

printer means for generating a printout of the display.

130. An interrogator for identifying a plurality of transponders, the interrogator comprising:

transmitter means for transmitting an interrogation signal to the plurality of transponders, wherein, transponders which identified themselves from the interrogation signal are capable of being disabled by an instruction in the interrogation signal;

receiver means for receiving response signals from the plurality of transponders; and means for identifying the plurality of transponders from the response signals;

the interrogator transmitting the interrogation signal and an inhibiting signal, wherein a disabled transponder remains disabled while the disabled transponder continued receiving the inhibiting signal.

131. An interrogator according to claim 130, wherein:

the interrogation signal and the inhibiting signal are relatively narrow bandwidth signals.

132. An interrogator according to claim 131, wherein:

the interrogation signal is modulated with data, the data modulation bandwidth of the interrogation signal being less than a spacing between the respective different frequencies of the interrogation signal and the inhibiting signal.

133. An interrogator according to claim 130, wherein:

the interrogation signal is a relatively directional signal; and the inhibiting signal is a relatively widely dispersed signal.

134. An interrogator according to claim 133, wherein:

the inhibiting signal has a beam width which is at least 5 times greater than that of the interrogating signal.

135. An interrogator according to any one of claims 130 to 134, wherein:

the interrogation signal is a relatively high power signal; and the inhibiting signal is a relatively low power signal.

136. An interrogator according to any one of the claims 130 to 134, wherein:

a turn-off instruction is transmitted in both the interrogation signal and the inhibiting signal.

137. An interrogator according to any one of claims 130 to 134, wherein:

the interrogation signal and the inhibiting signal have respective different frequencies.

138. An interrogator according to any one of claims 130 to 134, wherein:

the interrogation signal and the inhibiting signal have respective different frequencies which are selected so that there are no overlapping nulls in the electric fields of the interrogation signals within a predetermined distance of the transmitter means of the interrogator.

139. An interrogator according to any one of claims 130 to 134, wherein:

the interrogator detects transponder response signals transmitted on a frequency of the inhibiting beam and disregards such transponder response signals.

140. An interrogator according to any one of claims 130 to 134, wherein:

the interrogator is a hand-held type interrogator.

* * * * *